United States Patent [19]

Kachik et al.

[11] 3,942,578

[45] Mar. 9, 1976

[54] METHOD OF REPAIRING LARGE CASTINGS

[75] Inventors: Robert H. Kachik, Washington Township, Westmoreland County; Samuel J. Manganello, Penn Hills Township, Allegheny County; Arthur J. Pignocco, Franklin Township, Westmoreland County, all of Pa.

[73] Assignee: United States Steel Corporation, Pittsburgh, Pa.

[22] Filed: Oct. 25, 1974

[21] Appl. No.: 517,992

Related U.S. Application Data

[63] Continuation of Ser. No. 332,870, Feb. 15, 1973, abandoned.

[52] U.S. Cl. .................................... 164/54; 164/92
[51] Int. Cl.² ........................................ B23K 23/00
[58] Field of Search ......... 164/53, 54, 92; 29/498.5; 249/93

[56] References Cited

UNITED STATES PATENTS

| 3,264,696 | 8/1966 | Funk | 164/54 |
| 3,396,776 | 8/1968 | Funk | 164/92 X |
| 3,421,570 | 1/1969 | Guntermann | 29/498.5 X |
| 3,633,866 | 1/1972 | Funk | 249/93 X |
| 3,856,076 | 12/1974 | Adams et al. | 164/54 X |

FOREIGN PATENTS OR APPLICATIONS

| 1,587,253 | 3/1970 | France | 29/498.5 |
| 1,061,157 | 12/1956 | Germany | 29/498.5 |

*Primary Examiner*—R. J. Shore
*Attorney, Agent, or Firm*—Forest C. Sexton

[57] ABSTRACT

A method of repairing large castings, such as ingot molds and mold stools, by employing an aluminothermic reduction reaction. The resultant repaired article has a metallurgically bonded plug in the crack, hole, break, or eroded surface. An alternative repair method of big-end-up ingot molds is disclosed which comprises forming a ceramic lining on the bottom of the mold.

3 Claims, 11 Drawing Figures

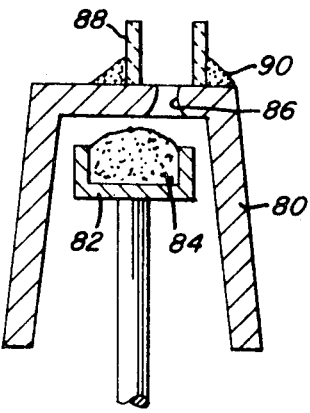
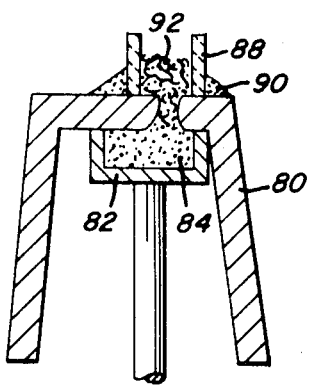
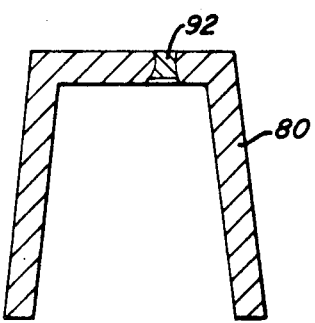

METHOD OF REPAIRING LARGE CASTINGS

This application is a continuation of application Ser. No. 332,870, filed Feb. 15, 1973, now abandoned.

This invention relates to a relatively inexpensive method for repairing ingot molds and stools which utilizes an aluminothermic reduction (ATR) bulk metal deposition process to effect such repair.

A practical method for the repair of ingot molds and stools damaged in service has been in great demand by steelmakers because mold and stool performance relates directly to the cost of steel production. Among the major reasons for the scrapping or rejecting of molds and stools, which are usually made of cast iron, are cracking of mold walls and stool seats, and erosion of mold bottoms and stool seats. Conventional bulk welding methods for the repair of mold and stools are costly, time-consuming, and usually unsatisfactory as the weldments often crack and fall out. In an attempt to improve the welding method and to lock in the weldment, V- or U-shaped notches or grooves or dovetailed grooves are machined into the surface and the notches are filled with weld metal. This procedure has been generally successful, but remains quite costly. Attempts to fill cracks and craters with ceramic material have failed. Steel plates, spiked into place over cracks and holes on the outside of molds, have been used to contain and prevent cracks in molds from propagating further, but again this type of repair is not completely satisfactory as molten metal can still enter the cracks and holes making ingot stripping extremely difficult.

In Hammerle U.S. Pat. No. 3,629,928, a repair method was described in which a groove was first cut along the damaged area in the mold wall. A plurality of nails or bolt heads extended into the groove. The groove was filled with weld metal such that a breakout of the weld metal was minimized. Although successful, the method was very expensive.

We are aware of the following prior art concerning aluminothermic welding processes:

Millward U.S. Pat. No. 1,594,182
Carpenter et al U.S. Pat. No. 2,515,191
Funk U.S. Pat. No. 3,264,696
Funk U.S. Pat. No. 3,396,776
Guntermann U.S. Pat. No. 3,421,570

We have invented a method for repairing large castings, such as ingot molds and stools, which employs an exothermic reduction reaction, such as an aluminothermic reduction (ATR) reaction, to generate the filler metal, and utilizes the large amount of heat energy evolved from the reaction to weld bond the metal phase to the mold material. The chemical reaction can be represented as:

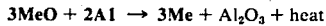
$$3MeO + 2Al \rightarrow 3Me + Al_2O_3 + heat$$

where MeO represents the oxide of the metal to be deposited, such as hematite ($Fe_2O_3$), Al is the aluminum fuel and $Al_2O_3$ the oxide of aluminum, which is a major constituent of the resulting slag. One novel and critical step in our method is the proper disposition of the ATR charge when the ATR reaction is initiated. The ATR charge, consisting of a stoichiometric mixture of aluminum and iron oxide, is placed on the defective piece surrounding the defect, and contained by a refractory perimeter. Since the reaction takes place and the superheated metal is generated in intimate contact with the substrate surface instead of in a crucible as is normally practiced, the heat of reaction is efficiently utilized, thereby enhancing the bonding of the deposited metal to the steel substrate.

It is the primary object of this invention to provide a method of repairing large castings such as ingot molds and stools which requires no surface preparation of the casting.

It is another object to provide a method of repairing ingot molds or stools which is quick and economical.

It is also an object to provide a method of repairing ingot molds and stools that can be performed without elaborate or expensive equipment.

It is another object to provide a method of repairing mold stools that can be performed without removing the stools from the ingot cars on which they are mounted.

It is a further object to provide a method for forming a high-melting, abrasion-resistant ceramic liner in the bottom of a big-end-up (BEU) closed-bottom ingot mold.

These and other objects will become more readily apparent by reference to the following detailed specification and the attached drawings in which:

FIG. 9 is a transverse cross-section of an inverted big-end-up ingot mold, the bottom of which has been perforated, and associated equipment for repairing it according to the invention.

FIG. 10 is a partial transverse cross-section of the mold of FIG. 9 showing a different step in the inverted repair method.

FIG. 11 is a partial transverse cross-section of the repaired mold of FIGS. 9 and 10.

Figure 1:
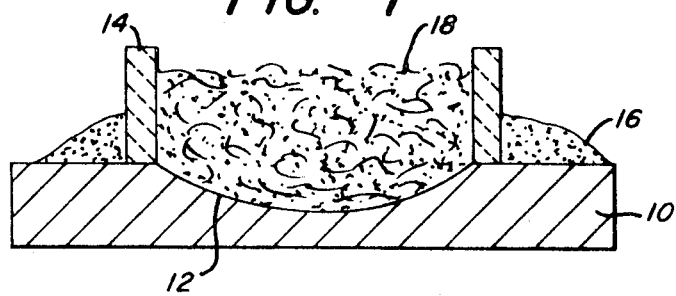
FIG. 1 is a transverse cross-section of an eroded mold stool and the necessary apparatus to accomplish our method.
Figure 2:
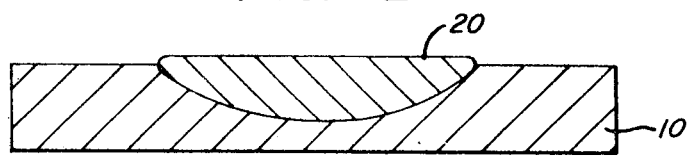
FIG. 2 is a transverse cross-section of a mold stool repaired by the invented method.

As shown in FIG. 1, a mold stool 10 has been eroded in service to such an extent that a crater 12 exists in the surface of the stool. We repair this stool while it remains on the ingot car, by placing a refractory perimeter 14 around the crater 12 to form a butt joint with the stool, banking loose particulate insulating material such as sand 16 around the joint, placing an exothermic reaction mixture 18 inside the perimeter 14, and igniting the mixture. The perimeter 14 is advantageously made of graphite. The mixture 18 is preferably an aluminothermic reduction (ATR) reaction mixture. The mixture consists of about three parts powdered iron oxide, which is preferably $Fe_2O_3$ and not finer than +200 mesh, and preferably having a size at least as fine as −35 mesh, one part aluminum powder preferably having a size between about −100 mesh and +325 mesh. Other fuels that might be used instead of aluminum are magnesium, calcium, silicon and calcium-silicon alloy or mixtures thereof. The ATR mixture is ignited by a flame, flare or hot filament. The reaction causes the formation of a superheated melt comprising a metal phase 20 (FIG. 2) and a slag phase, not shown. The more dense metal phase quickly separates from the melt and settles to the bottom where it becomes metallurgically bonded to the stool. Any oxide scale which may have existed on the surface of the mold stool is either chemically reduced or melted with the slag material and thus is removed from the surface so that it does not interfere with bonding. It is believed that this "in situ" bulk deposition process uses the heat of reaction efficiently to provide a mechanism for cleaning and descaling the surfaces, thereby enhancing the formation of additional filler material which becomes welded to the stool. Upon cooling, the perimeter 14 and the slag phase are removed to reveal a repaired stool (FIG. 2) in which a metal phase 20 has been weld bonded to the stool 10.

Figure 3:
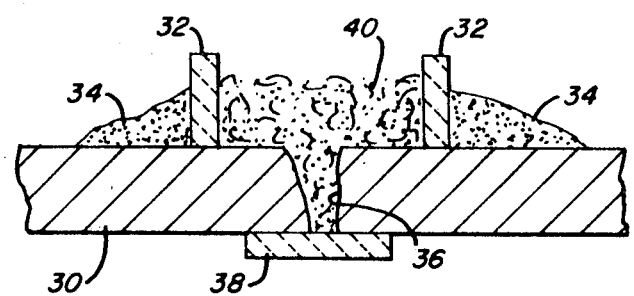
FIG. 3 is a partial transverse cross-section of a perforated ingot mold wall to be repaired by our method.
Figure 4:
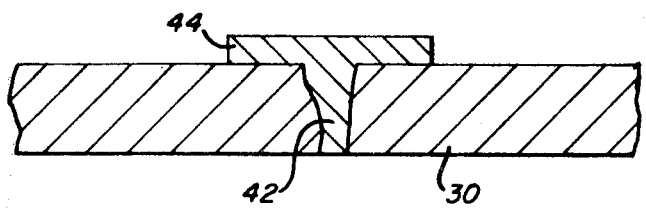
FIG. 4 is a partial transverse cross-section of the repaired ingot mold wall of FIG. 3.

FIGS. 3 and 4 illustrate the invented method as applied to the repair of cracks or other breaks which may have completely penetrated the mold wall. This method can be used for filling large cracks in the mold wall or for placing a deposited metal band across a crack to prevent further propagation. As shown in FIG. 3, a mold 30 is placed on its side and the outside (upper) surface of the mold is fitted with a refractory perimeter 32 and backed with sand 34. If the damage is so severe that the crack 36 penetrates the mold wall, an additional piece of refractory 38 is positioned on the interior wall to seal the crack opening. An ATR charge 40 is then placed on the mold surface to the desired depth inside the refractory perimeter 32, and the ATR reaction is initiated. Upon cooling, the slag phase and perimeter 32 are removed. The crack in the mold has been filled with a metal filler material 42 which is metallurgically bonded to the sides of the crack 36. In addition, if sufficient charge material is employed, a band of deposit metal 44 is bonded to the mold 30 on both sides of the crack and to the filler material 42 to reinforce the mold wall and thus minimize further propagation of the crack. This band 44, being on the outside of the mold, is not subject to erosion or damage from hot metal.

Figure 5:
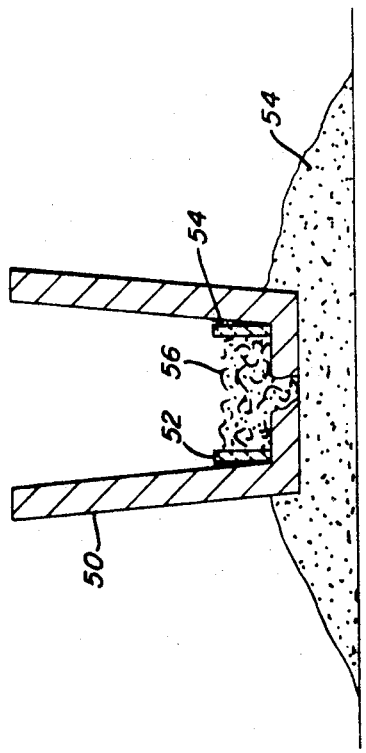
FIG. 5 is a transverse cross-section of a big-end-up (BEU) closed-bottom ingot mold with a perforated bottom.
Figure 6:
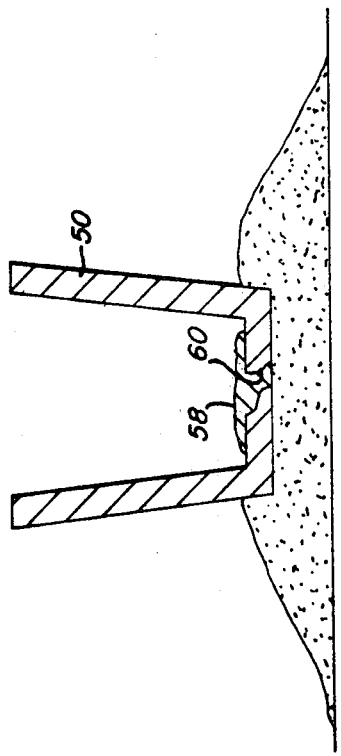
FIG. 6 is a transverse cross-section of the repaired mold of FIG. 5.

FIGS. 5 and 6 illustrate our method as applied to the repair of perforated or badly eroded BFU closed-bottom molds. In some applications, mold 50 is fitted with a refractory perimeter 52. In other applications, this perimeter is not necessary as the walls of the mold form the perimeter. Sand 54 is placed around the perimeter and around the mold 50 to contain the reaction products. An ATR mixture 56 is then placed inside the perimeter and the ATR reaction is initiated. Upon cooling, the slag layer is removed. The repaired mold (FIG. 6) has a metal plug 58 metallurgically bonded to the sides of the hole 60.

Figure 7:
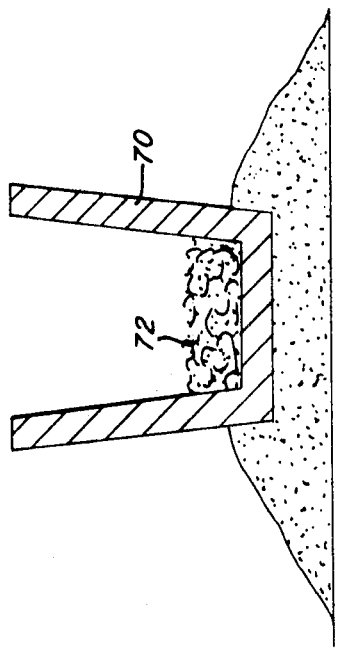
FIG. 7 is a transverse cross-section of a big-end-up ingot mold set-up according to our method of depositing an abrasion-resistant monolithic ceramic liner in the bottom thereof.
Figure 8:
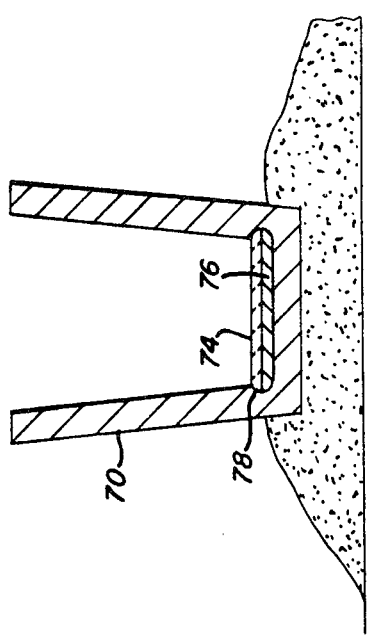
FIG. 8 is a transverse cross-section of the ingot mold of FIG. 7 after deposition of a ceramic bottom liner.

FIGS. 7 and 8 illustrate the method of forming a high-melting, abrasion-resistant, monolithic alumina layer in the bottom of a BEU mold 70. In this application, sufficient ATR mixture 72 is used to assure a continuous layer of high alumina slag 74 completely covering the bottom of the mold. The ATR procedure is carried out as before except in this application, no attempt is made to remove the $Al_2O_3$ phase 74 from the metal phase 76. Because no refractory perimeters are used, the $Al_2O_3$ layer penetrates into the walls of the mold at points 78 and is thus securely locked into the mold. Such a ceramic liner will greatly lengthen the life of this mold as well as minimize the welding and sticking of an ingot to the mold bottom.

FIGS. 9, 10 and 11 illustrate an alternative method of repairing a BEU mold having a badly perforated bottom. Mold 80 is inverted leaving access to the open end. A sealing means 82 carrying particulate material such as sand 84 is positioned against the mold bottom as shown in FIG. 10. This can be accomplished either by placing the mold 80 on member 82 or by moving member 82 upwardly against the mold bottom. The sand 84 partially enters the hole 86 and thus prevents the formation of ears in the bottom of the mold. Ears tend to be pulled out and with them, the plug material, when a subsequently poured ingot is removed from the mold. A refractory perimeter 88 is placed on the mold to form a joint with it and sealing sand 90 is banked around the joint. An exothermic reaction mixture 92 is placed within perimeter 88 and the reaction is initiated. When the slag phase, perimeter, and sealing means are removed, the mold has a plug 92 metallurgically bonded to the sides of the hole 86 as shown in FIG. 11.

It can readily be seen from the foregoing that we have invented a method of repairing large castings such as cast iron ingot molds and stools which is quick and economical, requires no surface preparation, can be performed without elaborate equipment, and can be performed on stools without removing them from the ingot cars on which they are mounted. Further, we have invented a method of forming an abrasion-resistant liner in the bottom of a BEU ingot mold.

We claim:

1. A method of repairing a defect in a large metal casting, consisting of:
   placing a graphite refractory containment apparatus on the casting around the defect and forming a joint with the casting;
   placing loose particulate insulating material on said casting around said joint;
   filling said containment apparatus to a predetermined level with an exothermic reaction mixture in direct contact with said metal casting;
   igniting the mixture to form a superheated melt comprising a heavier metal phase and a lighter slag phase;
   maintaining said melt in contact with said casting for a time sufficient to allow said melt to separate into said metal phase in contact with said casting and said slag phase thereover and to permit said metal phase to enter and fill said defect;
   solidifying said melt to form a metallurgically bonded weldment in said defect; and
   removing said containment apparatus and the overlying solidified slag.

2. A method in accordance with claim 1, wherein the exothermic reaction mixture comprises a substantially stoichiometric mixture of $Fe_2O_3$ and aluminum powders.

3. A method in accordance with claim 1, wherein the casting is a cast iron ingot mold or stool.

* * * * *